United States Patent
Herberger

(10) Patent No.: US 11,105,289 B2
(45) Date of Patent: Aug. 31, 2021

(54) METHOD AND CONTROL DEVICE FOR MONITORING THE FUNCTION OF A PARTICULATE FILTER

(71) Applicant: Robert Bosch GmbH, Stuttgart (DE)

(72) Inventor: Patrik Herberger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 12 days.

(21) Appl. No.: 16/663,908

(22) Filed: Oct. 25, 2019

(65) Prior Publication Data
US 2020/0131972 A1    Apr. 30, 2020

(30) Foreign Application Priority Data
Oct. 31, 2018  (DE) .......................... 102018218695.2

(51) Int. Cl.
| | | |
|---|---|---|
| B01D 46/44 | (2006.01) | |
| F02D 41/14 | (2006.01) | |
| F01N 11/00 | (2006.01) | |
| F02D 41/02 | (2006.01) | |
| F01N 3/021 | (2006.01) | |

(52) U.S. Cl.
CPC ....... *F02D 41/1466* (2013.01); *B01D 46/442* (2013.01); *F01N 3/021* (2013.01); *F01N 11/007* (2013.01); *F02D 41/0235* (2013.01); *F01N 2550/04* (2013.01); *F02D 2200/0812* (2013.01); *F02D 2200/101* (2013.01); *F02D 2200/1002* (2013.01); *F02D 2200/703* (2013.01)

(58) Field of Classification Search
CPC .. F02D 41/1466; F01N 11/007; B01D 46/442
See application file for complete search history.

(56) References Cited

U.S. PATENT DOCUMENTS

| | | | | |
|---|---|---|---|---|
| 5,653,106 A | * | 8/1997 | Katashiba | ........... F28D 20/0034 60/300 |
| 2008/0000286 A1 | * | 1/2008 | Strohmaier | ......... F02D 41/1467 73/23.21 |

(Continued)

FOREIGN PATENT DOCUMENTS

| | | |
|---|---|---|
| DE | 102005012950 A1 | 9/2006 |
| DE | 102006018956 A1 | 10/2007 |

(Continued)

*Primary Examiner* — Matthew T Largi
(74) *Attorney, Agent, or Firm* — Michael Best & Friedrich LLP

(57) ABSTRACT

A method and control device for monitoring the function of a particulate filter in an exhaust gas duct of an internal combustion engine. A soot emission in the exhaust gas duct downstream from the particulate filter is determined with a particle sensor, an expected soot emission after a limit particulate filter at the location of the particle sensor is simulated and a comparison value is ascertained. A good particulate filter is found if the measured soot emission is less than the comparison value of the simulated soot emission. A defective particulate filter is found if the measured soot emission is higher than the comparison value of the simulated soot emission. The simulated soot emission is determined as being a simulated soot particle concentration at the installation site of the particle sensor such that a basic soot concentration in a soot concentration model is corrected at least with an oxygen correction.

16 Claims, 3 Drawing Sheets

(56) References Cited

U.S. PATENT DOCUMENTS

Figure 1:
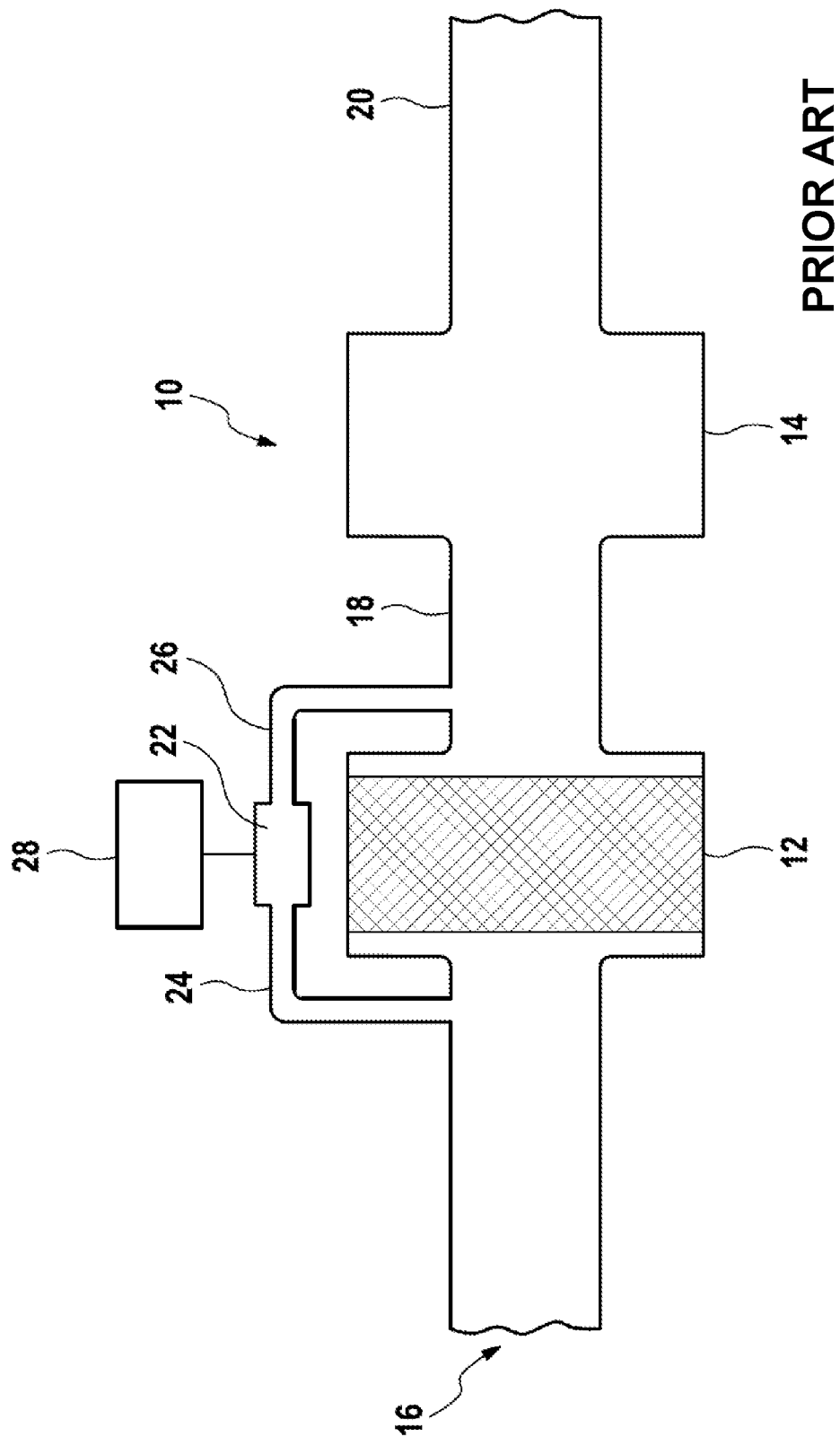

| | | | |
|---|---|---|---|
| 2009/0254264 A1* | 10/2009 | Kirstaetter | F02D 41/1458 701/109 |
| 2010/0101213 A1* | 4/2010 | Tuomivaara | F01N 3/2053 60/276 |
| 2010/0180669 A1* | 7/2010 | Baars | F01N 11/00 73/28.04 |
| 2011/0047985 A1* | 3/2011 | Zawacki | F02D 41/1494 60/286 |
| 2012/0174653 A1 | 7/2012 | Ikawa et al. | |
| 2017/0182447 A1* | 6/2017 | Sappok | B01D 46/0086 |
| 2018/0067090 A1* | 3/2018 | Hopka | G01N 33/007 |

FOREIGN PATENT DOCUMENTS

| | | |
|---|---|---|
| DE | 102007061468 A1 | 7/2008 |
| DE | 102013206391 | 10/2014 |
| DE | 102013206451 | 10/2014 |
| DE | 102014206252 | 10/2015 |
| DE | 102017205690 A1 | 10/2018 |
| DE | 102017206252 A1 | 10/2018 |
| EP | 2574762 A1 | 4/2013 |

\* cited by examiner

METHOD AND CONTROL DEVICE FOR MONITORING THE FUNCTION OF A PARTICULATE FILTER

BACKGROUND OF THE INVENTION

The invention relates to a method for monitoring the function of a particulate filter, especially a Diesel particulate filter, in an exhaust gas duct of an internal combustion engine, wherein a soot emission in the exhaust gas duct downstream from the Diesel particulate filter is determined with a particle sensor, wherein an expected soot emission after a limit particulate filter at the location of the particle sensor is simulated and wherein a good particulate filter is found if the measured soot emission is less than the simulated soot emission and a defective particulate filter is found if the measured soot emission is higher than the simulated soot emission.

The invention moreover relates to a control device for monitoring the function of a particulate filter, especially a Diesel particulate filter, in an exhaust gas duct of an internal combustion engine, wherein a particle sensor is provided in the exhaust gas duct downstream from the particulate filter in order to determine a degree of damage of a particulate filter, wherein a predicted time to reach a flow threshold value after a limit particulate filter at the location of the particle sensor is calculated and wherein a good particulate filter is found if the measured time to reach a flow threshold value is greater than the predicted time to reach a flow threshold value and a defective particulate filter is found if the measured time to reach a flow threshold value is less than the predicted time to reach a flow threshold value.

Vehicles with Diesel-operated internal combustion engines are outfitted, among other things, with a Diesel particulate filter (DPF) in the exhaust gas duct in order to observe the regulations concerning their emissions. The regulations concerning the On-Board Diagnostics (OBD2) require a monitoring of the exhaust-relevant components of the vehicle, and thus also the monitoring of the functionality of the Diesel particulate filter. With the lowering of the OBD limit values for the particulate emission (CARB legislation MY13: 17.5 mg/ml; European legislation Euro6-2: 12 mg/km; European legislation EUVI-C: 25 mg/kWh), in many cases the monitoring is no longer possible by a monitoring of the differential pressure across the Diesel particulate filter but rather a particle sensor needs to be installed behind the Diesel particulate filter. In the event of a defective Diesel particulate filter, soot particles in a typical particle sensor build up on two comb-shaped intermeshing electrodes of the particle sensor and due to their electrical conductivity a decrease occurs in the electrical resistance between the electrodes. When an electrical voltage is applied, an electrical current can thus be measured. After a threshold value of the soot coverage, the current rises with increase in the soot coverage. If the current increases beyond a threshold value within a given coverage time, a defective particulate filter will be found in the sense of the OBD2 legislation. At the start of a new measurement cycle, the particle sensor is heated and the accumulated soot particles are burned off.

Due to the functional principle of the collecting particle sensor, it cannot directly measure the soot concentration in the exhaust gas. Instead, a time is measured until the electrical current at the particle sensor has risen beyond a threshold value. This measured time is compared to a predicted time from a comparison model. This comparison model has the soot particle concentration in the exhaust gas flow as its input variable, among others. This soot concentration itself is formed by a further model, which depending on parameters such as an engine operating point, an oxygen concentration in the exhaust gas and/or an exhaust gas recirculation rate (EGR rate) puts out a soot particle mass flow after a limit-value Diesel particulate filter in the sense of the OBD regulations. In the DPF diagnostic function, a soot particle concentration for the comparison model is calculated from this soot particle mass flow. In this way, with the help of the diagnostic function, it can be determined whether a defective DPF or a good DPF is at hand.

From DE102014 206252 B4 there is known a method for the diagnosis of the functionality of a Diesel particulate filter situated in the exhaust gas tract of a motor vehicle with the following steps:
performing an emission test with the vehicle and measuring the particulate emission with the aid of a particle sensor connected downstream from the particulate filter at a first established emission limit value in order to obtain a first particle model value (RM1);
performing an emission test with the vehicle and measuring the particulate emission with the aid of the particle sensor at a second established emission limit value in order to obtain a second particle model value (RM2);
measuring of the particulate emission during operation of the vehicle with the aid of the particle sensor and obtaining a particulate emission measured value (R);
determining of a diagnostic value ($FAC_{NOM}$) by the formula $$FAC_{NOM} = \frac{R - R_{M1}}{R_{M2} - R_{M1}};$$

comparing of the obtained diagnostic value ($FAC_{NOM}$) with an established limit value; and classifying the Diesel particulate filter as intact if the diagnostic value lies below the limit value, and as damaged if the diagnostic value lies above the limit value, wherein the first established emission limit value corresponds to the EU6 Diesel particulate emission limit value (ELimit-DPF) and the second established emission limit value corresponds to the EU6 On-Board-Diagnostics limit value (OBDLimit-DPF).

Document DE102013 206 451 A1 describes a method for monitoring the filtering ability of a particulate filter situated in the exhaust gas tract of a motor vehicle with the following steps: performing a first diagnostic phase by determining an efficiency value of the particulate filter and comparing this to an expectation value;
setting a fault suspicion upon the efficiency value reaching or falling short of the expectation value;
upon setting a fault suspicion, increasing of the particulate emissions in the exhaust gas of the corresponding motor vehicle engine and thereby reducing the variation of the ascertained filter efficiency value; and
performing a second diagnostic phase similarly to the first diagnostic phase.

Document DE102013 206 391 A1 describes a method for checking the functionality of a particulate filter situated in the exhaust gas tract of a motor vehicle with the following steps: measuring the particle concentration (c_1) in the exhaust gas downstream from the particulate filter at a first operating point;
determining the filter efficiency (eff_1) from the measured particle concentration (c_1) and the simulated particle concentration upstream from the particulate filter;

changing the operating point of the engine to a second operating point, so that the particulate emissions upstream from the particulate filter increase greatly;

measuring the particle concentration (c_2) in the exhaust gas downstream from the particulate filter at the second operating point;

determining the filter efficiency (eff_2) at the second operating point similarly to the procedure at the first operating point;

determining the absolute difference between the filter efficiencies (eff_1 and eff_2); and determining an offset error if the absolute difference between the filter efficiencies (eff_1 and eff_2) goes beyond an established threshold.

The problem which the invention proposes to solve is to provide a method enabling an easier diagnosis of the functionality of a particulate filter, especially a Diesel particulate filter, by using a more easily parametrized soot model.

A further problem which the invention proposes to solve is to provide a control device suited to carrying out the method.

SUMMARY OF THE INVENTION

The problem of the invention is solved in regard to the method in that the simulated soot emission is determined as being a simulated soot particle concentration at the installation site of the particle sensor. Thanks to the model approach, a repeated converting of soot concentrations into soot mass flows and back to soot concentrations is avoided. Furthermore, the risk of data loss due to the conversion steps can be avoided. Thus, the diagnostics for the functionality of the Diesel particulate filter are simplified. A further benefit of the sole use of concentration values throughout is a good correlation between the soot concentration and other exhaust gas variables, making a model approach easier. This also has a beneficial effect on reducing the number of characteristic curves and characteristic maps, as well as the overall computing expense. The procedure therefore reduces the parametrization expense and the computing time.

Because the simulated soot particle concentration is parametrized with soot concentration data when setting up the model, the devices typically used in reference measurement techniques can be employed, such as a micro-soot sensor (MSS), which determine the soot concentrations without their output values needing to be converted from concentrations to soot masses.

A control device or arithmetic unit according to the invention, e.g., a controller of a motor vehicle, is designed, in particular by programming, to carry out a method according to the invention. In the control device a program sequence or a circuit for the simulation of a soot particle concentration as the simulated soot emission at the installation site of the particle sensor can be provided. The control unit can be simplified in its structure thanks to the reduced computational expense.

The implementing of the method in the form of a computer program is also advantageous, since this produces particularly low costs, especially if a controller executing it is also used for further tasks and therefore would be present in any case. Suitable data media for the providing of the computer program are in particular magnetic, optical and electrical storage media, such as hard disks, flash memories, EEPROMs, DVDs and so forth. A downloading of a program through computer networks (Internet, intranet, etc.) is also possible.

Figure 2:
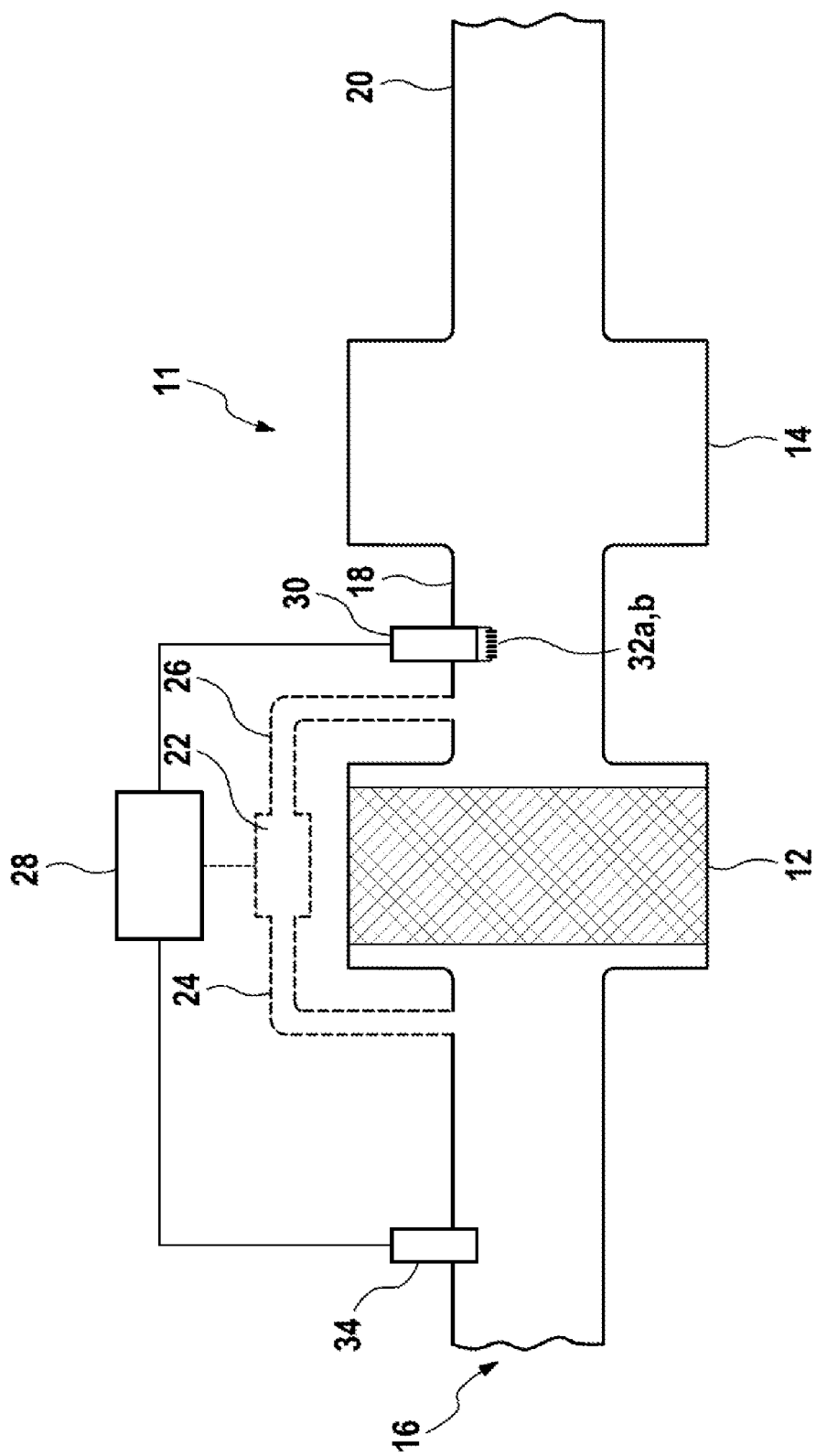
Figure 3:
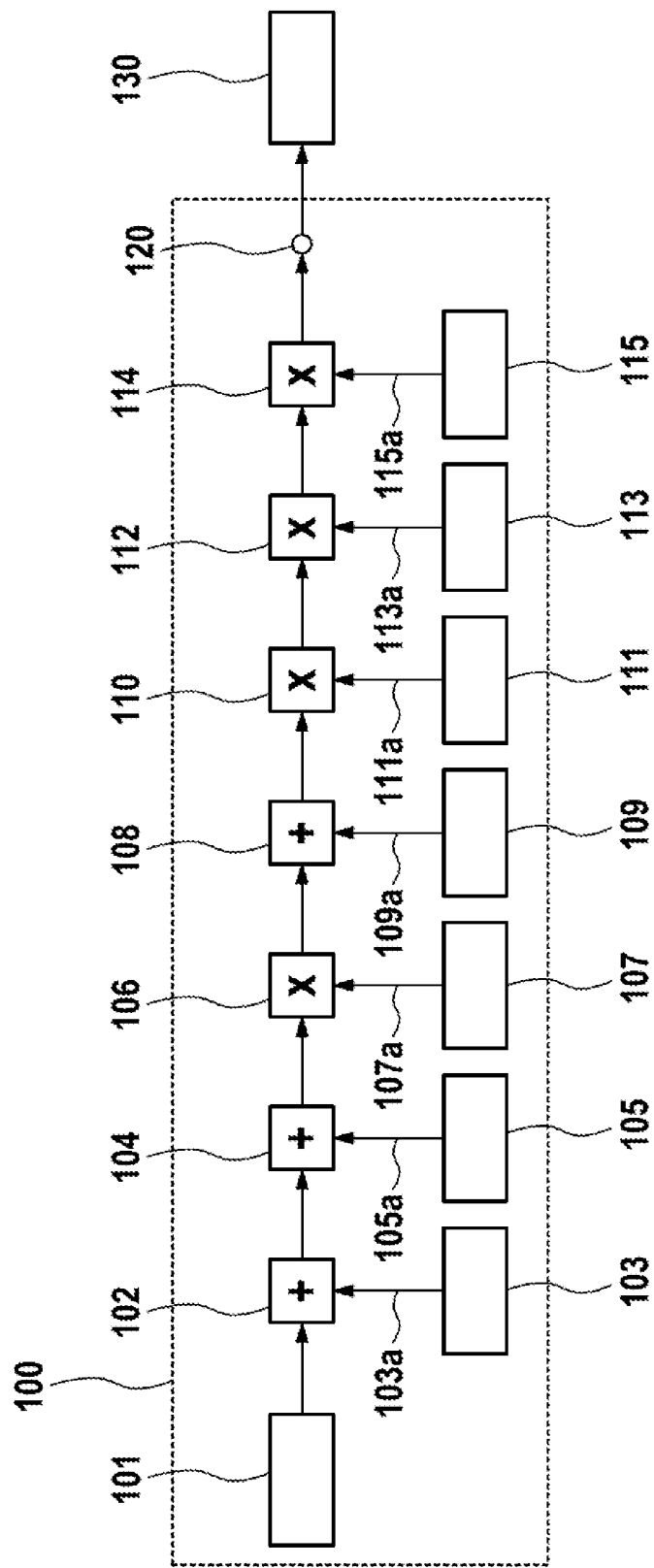

Further advantageous embodiments of the invention will emerge from the specification and the accompanying drawing. There are shown:

FIG. 1, a schematic representation of an exhaust gas system according to the prior art;

FIG. 2, a schematic representation of an exhaust gas system according to the invention; and FIG. 3, a method based on a soot concentration model according to the invention.

DETAILED DESCRIPTION

The prior art is soot simulation on the basis of soot particle mass flows by various techniques. The drawback to this method is that it requires a double converting of a concentration, which is typically determined by mensuration, into a mass flow, obtained on the basis of a model, and back to a concentration, which is the basis of a diagnostic function for assessing whether the DPF is good or defective. This is costly in computing time and carries the risk of data loss during the conversions.

FIG. 1 shows schematically an exhaust gas system 10 with a particulate filter 12 and a muffler 14. Exhaust gases from an internal combustion engine (not shown) are taken through an exhaust gas supply 16 to the particulate filter 12, flow through the particulate filter 12, then flow through an exhaust gas connecting pipe 18, then through the muffler 14, and are then put out to the surroundings through the exhaust gas discharge 20. In modern internal combustion engines, the combustion generally occurs with a fuel and air mix where the occurrence of soot particles cannot always be prevented. By flowing through the particulate filter 12, soot particles contained in the exhaust gas are filtered out from the exhaust gas flow, so that the muffler 14 receives through the exhaust gas connecting pipe 18 only exhaust gas which is largely particle-free. Then, in the muffler 14, an acoustical dampening occurs, so that the exhaust gases upon exiting through the exhaust gas routing 20 only generate a slight or at least diminished noise level.

In order to determine how many soot particles have already been stored in the particulate filter 12 by filtering from the exhaust gas, a differential pressure sensor 22 is provided. By evaluating the differential pressure before and after the particulate filter 12 in the exhaust gas flow, it can be judged how many soot particles or how much soot mass are/is already contained in the particulate filter 12, since the soot particles or soot mass contained in the particulate filter 12 reduce the available cross section for the flow and thus the pressure drop across the particulate filter 12 is a measure of the charging, i.e., the quantity of soot particles or soot mass contained in the particulate filter 12. A direct measurement of the charging of the particulate filter is at times difficult, since for example in gasoline engines the pressure difference is only slight and the small pressure differences can only be measured with difficulty on account of the continuously changing operating conditions.

The differential pressure sensor 22 is connected by a first pressure line 24 to the exhaust gas supply 10 upstream from the particulate filter and by a second pressure line 26 to the exhaust gas connecting pipe 18 downstream from the particulate filter 12 in order to measure the pressure difference. The differential pressure sensor 22 contains a membrane whose deflection is dependent on the relative pressure in the first pressure line 24 and the second pressure line 26 and it generates a corresponding differential pressure signal, which is relayed to a control device 28 for evaluation. If, on the basis of the evaluation of the signals of the differential pressure sensor 22, it is determined that the particulate filter 12 contains a large amount of soot particles, a regeneration process may be initiated in dependence on further boundary conditions, during which the soot particles contained in the particulate filter 12 are burned by an oxidation, i.e., converted into gaseous products. Alternatively or cumulatively, the differential pressure can be used to determine whether a particulate filter is defective or not.

Furthermore, another exhaust gas system 11 is shown in FIG. 2. The same or equivalent components of the exhaust gas system 10 have been designated with the same reference numbers. The exhaust gas system 11 may comprise a differential pressure sensor 22 with the corresponding pressure lines 24 and 26 (shown as broken lines). The exhaust gas system 11 furthermore comprises, in section 18, a particle sensor 30, which is mounted in the exhaust gas duct downstream from the particulate filter 12 for the monitoring of its function.

The particle sensor 30 is connected to the control device 28 for the exchanging of data and for the monitoring of the function of the particulate filter 12. By using the data collected by means of the particle sensor 12, in the course of a method 100 which can be implemented in the control device 28 and which shall be explained more closely below, a degree of damage of the particulate filter 12 can be determined, wherein a predicted time to reach a flow threshold value after a limit particulate filter at the location of the particle sensor 12 is calculated and wherein a good particulate filter is found if the measured time to reach a flow threshold value is greater than the predicted time to reach a flow threshold value and a defective particulate filter is found if the measured time to reach a flow threshold value is less than the predicted time to reach a flow threshold value.

In particular, vehicles with Diesel-operated internal combustion engines are outfitted, among other things, with a Diesel particulate filter (DPF) in the exhaust gas duct in order to observe the regulations concerning their emissions. However, vehicles with gasoline engines may also be outfitted with particulate filters and corresponding diagnostics. The regulations concerning the On-Board Diagnostics (OBD2) require a monitoring of the exhaust-relevant components of the vehicle, and thus also a monitoring of the functionality of the Diesel particulate filter. With the lowering of the OBD limit values for the particulate emission (CARB legislation MY13: 17.5 mg/ml; European legislation Euro6-2: 12 mg/km; European legislation EUVI-C: 25 mg/kWh), the monitoring solely on the basis of the differential pressure across the particulate filter 12 is no longer adequate, but instead there is needed, alternatively or cumulatively, the particle sensor 30 which is mounted downstream from the particulate filter 12.

In the event of a defective particulate filter 12, soot particles in a typical particle sensor 30 build up on two comb-shaped intermeshing electrodes 32 $a,b$ of the particle sensor 30 $a,b$ ab and due to their electrical conductivity a decrease occurs in the electrical resistance between the electrodes 32 $a,b$. When an electrical voltage is applied, an electrical current can thus be measured, which is dependent on the charging state of the electrodes with soot particles. After a threshold value of the soot coverage of the electrodes 32 $a,b$, the current rises with increase in the soot coverage. If the current increases beyond a threshold value within a given coverage time, a defective particulate filter will be found in the sense of the OBD2 legislation. At the start of a new measurement cycle, the particle sensor 30 is heated and the accumulated soot particles on the electrodes 32 $a,b$ are burned off.

Due to the functional principle of the collecting particle sensor 30, it cannot directly measure the soot concentration in the exhaust gas. Instead, a time is measured until the electrical current at the particle sensor 30 has risen beyond a threshold value. This relation would also be equivalent to a corresponding change in the resistance or a corresponding voltage drop across the electrodes 32 $a,b$ of the particle sensor 30. This measured time is compared to a predicted time from a comparison model. This comparison model has the soot particle concentration in the exhaust gas flow as its input variable, among others. This soot concentration itself is formed by a further model, which depending on parameters such as an engine operating point, an oxygen concentration in the exhaust gas and/or an exhaust gas recirculation rate (EGR rate) puts out a soot concentration or a soot particle mass flow after a limit-value particulate filter in the sense of the OBD regulations. The oxygen concentration in the exhaust gas can be detected in particular by means of a Lambda probe 34 and the EGR rate by a corresponding mass or volume flow sensor (not shown). In the particulate filter diagnostic function, a soot particle concentration for the comparison model is calculated from this soot particle mass flow. In this way, with the help of the diagnostic function comprising the comparison function according to the invention, it can be determined whether a defective particulate filter or a good particulate filter is at hand. This method is explained more closely below.

FIG. 3 shows a soot concentration model 100 according to the invention. The soot concentration model 100 serves as an input variable for a comparison model for monitoring the function of the particulate filter 12 and for deciding whether the particulate filter 12 is a defective particulate filter or a good particulate filter. Within this soot concentration model 100, a plurality of logic operations 102, 104, 106, 108, 110, 112, 114 are used. These logic operations 102, 104, 106, 108, 110, 112, 114 can basically be linked together as desired. By means of the model, a corrected soot concentration 102 after a limit particulate filter is determined as a comparison value.

In the soot concentration model 100, a basic soot concentration 101 is additively corrected in a first logic operation 102 by an oxygen correction 103, taking into account the oxygen concentration in the exhaust gas. The basic soot concentration 101 corresponds to the stationary soot emissions at the installed position of the particle sensor used to monitor the Diesel particulate filter. The oxygen correction 103 takes into account deviations of a simulated, expected oxygen concentration from an oxygen concentration measured with the Lambda probe in the exhaust gas or that determined from an oxygen signal of a nitrogen oxide sensor. These deviations influence the soot emission, so that it is provided to correct the soot concentration in the soot concentration model 100 in dependence on the difference between current and expected oxygen concentration in the exhaust gas and a fuel quantity injected into the internal combustion engine by means of an oxygen correction factor 103$a$ in a first characteristic map and if necessary to limit it to predetermined regions depending on the current EGR rate and rotational speed.

In a second logic operation 104, an additive smoke limit correction 105 is performed. This smoke limit correction 105 takes account of the fact that the soot emissions may be significantly increased when the operating point of the engine approaches the so-called smoke limit. This may be the case, for example, when a low-powered vehicle is driving up a slope with heavy load.

In the course of a determination, at first the difference between maximum possible fuel quantity upon reaching the smoke limit and the currently injected fuel quantity is formed. The maximum possible fuel quantity upon reaching the smoke limit can be memorized in a controller or the control device 28 as part of a characteristic map. The closer the smoke limit gets, the smaller this difference becomes. This difference, in addition to Lambda, which can be determined by means of the Lambda sensor 34 and/or based on a model, is the input variable for a characteristic map which puts out a correction factor 105*a*. This correction factor 105*a* in turn can be multiplied with a further factor, which is dependent on the particular engine operating point, rotational speed, and the injection quantity and/or the load. The aforementioned parameters of the engine operating points can be obtained in particular from the engine control system. Thus, depending on the engine operating point, the simulated soot concentration can be corrected for slight differences in Lambda and for the distance from the smoke limit. This is especially relevant for small Lambdas, since in this case small differences result in large changes in the soot emissions.

The result of the second logic operation 104 regarding the smoke limit correction 105 can be corrected multiplicatively in a third logic operation 106 by means of an environmental parameter correction 107. In particular, the environmental temperature and/or the environmental air pressure can be taken into account. The correction factor 107*a* is ascertained as a function of the respective engine operating point, which is determined in particular with the aid of the rotational speed and the injected fuel quantity or the load of the internal combustion engine, and the environmental conditions, especially the environmental temperature and/or the environmental air pressure. The aforementioned parameters may either be available in a characteristic map and be logically related to the corresponding correction factor 107*a*, or the correction factor 107*a* can be ascertained in the context of a model, especially in a controller.

In a fourth logic operation 108, a dynamic correction 109 is performed additively, taking into account the current engine operating point. For the dynamic correction 109, the gradient of a fuel injection quantity and an engine torque is formed and sent along with an engine torque to a fourth characteristic map, which corrects the simulated soot concentration by means of a dynamic correction factor 109*a*. Alternatively or cumulatively to the torque, the gradient of a torque can also be used. Furthermore, a rotational speed gradient and environmental conditions such as environmental air pressure, environmental temperature, cooling water temperature, exhaust gas recirculation rate and/or a Lambda value can be factored into the dynamic correction by multiplication.

The result of the fourth logic operation 108 can be further corrected in a fifth logic operation 110 by multiplication with an EGR correction 111. In this case, the exhaust gas recirculation rate (EGR rate), which is available as a variable in the controller, is taken into account. The EGR correction factor 111*a* for the correction of the simulated soot emissions or basic soot concentration for the DPF diagnostics is ascertained on the basis of the current overall EGR rate and the environmental temperature. The resulting EGR correction factor 111*a* may be further corrected afterwards by characteristic maps in dependence on environmental pressure, humidity and engine temperature.

The result of the fifth logic operation 110 can be further corrected in a sixth logic operation 112 by multiplication with a low-pressure EGR correction 113. This takes into account any additional low-pressure EGR fraction which is available as a variable in the controller. A corresponding low-pressure EGR correction factor 113*a* for the correction of the simulated soot emissions can be determined on the basis of a characteristic map or a model, using the overall EGR rate and the low-pressure EGR fraction.

The result of the logic operation 112 is corrected in a seventh logic operation 114 by multiplication with a correction factor 115*a* from the engine operating mode correction 115. This correction routine polls the current engine operating mode, especially in the engine controller, and compares it to an applicable bit mask. The bit mask is an array in which a value can be entered for each array location. If the applied value from the mask matches up with the current operating mode, the value at which place the operating modes agree (applied and currently occurring modes) is put out. In the present case, it is possible to compare 6, but basically any number of, different operating modes to each other. Hence, correction factors can then be put out in the different engine operating modes, which are dependent on the rotational speed and the injection quantity/load. The function then, according to the engine operating mode, switches to the corresponding correction map and puts out the correction factor.

In order to smooth out the output signal, the result from the respective logic operations 102, 104, 106, 108, 110, 112, 114 is filtered with a first-order low pass (PT1 element). The result is the corrected soot concentration 120.

In a diagnostic function 130, the corrected soot concentration 120 after a limit particulate filter is compared to the soot concentration determined in the exhaust gas after the particulate filter. Thus, it can be determined in the diagnostic function 130 whether a defective particulate filter or a good particulate filter is at hand. Thus, a repeated conversion from concentration to mass flow to concentration, as is typically done in the prior art, is avoided.

Basically, it is understood that the individual correction steps and the respective correction factors represented in the context of the method may be used alternatively or cumulatively for the correction. This means that each of these steps can be applied to the still uncorrected basic soot concentration (101) or to the basic soot concentration (101) already corrected by at least one of the steps.

The invention claimed is:

1. A method for monitoring the function of a particulate filter (12) in an exhaust gas duct (10) of an internal combustion engine, the method comprising:
   determining, with a particle sensor (30) positioned at a location in the exhaust gas duct (10) downstream from the particulate filter (12), a soot emission;
   simulating an expected soot emission of a particulate filter with an emission limit value at the location of the particle sensor (30); and
   ascertaining a comparison value;
   wherein a good particulate filter is found if the determined soot emission is less than the comparison value of the simulated soot emission and a defective particulate filter is found if the determined soot emission is higher than the comparison value of the simulated soot emission;
   wherein the simulated soot emission is determined as being a simulated soot particle concentration at the location of the particle sensor (30) in such a way that a basic soot concentration (101) in a soot concentration model (100) is corrected at least with an oxygen correction (103).

2. The method according to claim 1, wherein the determination of the soot emission and the simulation of the expected soot emission is done time-based with the aid of a current and/or voltage characteristic of the particle sensor (30), wherein the particulate filter is a Diesel particulate filter and wherein the good particulate filter is found if a measured time to reach a flow threshold value is greater than a predicted time to reach the flow threshold value and the defective particulate filter is found if the measured time to reach the flow threshold value is less than the predicted time to reach the flow threshold value.

3. The method according to claim 1, wherein soot concentration data ascertained by the particle sensor (30), is used to set up the simulated soot particle concentration in the soot concentration model (100).

4. The method according to claim 1, wherein the oxygen correction (103) considers an oxygen concentration in the exhaust gas, wherein the oxygen concentration in the exhaust gas is determined in a sensor-based and/or model-based manner.

5. The method according to claim 1, wherein a smoke limit correction (105) is done, wherein a difference between a maximum possible fuel quantity upon reaching a smoke limit and the currently injected fuel quantity is considered as a smoke limit correction factor (105a).

6. The method according to claim 5, wherein an oxygen concentration in the exhaust gas is considered when determining the smoke limit correction factor (105a).

7. The method according to claim 5, wherein the smoke limit correction factor (105a) is multiplied with a further factor, which is dependent on a particular engine operating point.

8. The method according to claim 7, wherein the engine operating point is a rotational speed and an injection quantity or load of the internal combustion engine.

9. The method according to claim 1, wherein an environmental parameter correction (107) is performed, wherein an environmental air pressure and/or an environmental temperature is determined, wherein a further correction factor (107a) is determined based on an engine operating point and at least one characteristic curve for the environmental air pressure and/or the environmental temperature, and wherein the correction factor is used to correct the basic soot concentration (101).

10. The method according to claim 1, wherein a dynamic correction (109) is performed in such a way that a dynamic correction factor (109a) is determined on the basis of a gradient of a fuel injection quantity and an engine torque and wherein the dynamic correction factor is used to further correct the basic soot concentration (101).

11. The method according to claim 1, wherein an EGR correction (111) is performed in such a way that an EGR correction factor (111a) is ascertained on the basis of an current overall EGR rate and an environmental temperature and wherein the EGR correction factor is used to further correct the basic soot concentration (101).

12. The method according to claim 1, wherein a low-pressure EGR correction (113) is performed in such a way that a low-pressure EGR correction factor (113a) is formed in dependence on a low-pressure EGR fraction and wherein the low-pressure EGR correction factor is used to further correct the basic soot concentration (101).

13. The method according to claim 1, wherein an engine operating mode correction (115) is performed in such a way that, depending on a selected operating mode of the internal combustion engine, an engine operating mode correction factor (115a) is ascertained and used to further correct the basic soot concentration (101).

14. The method according to claim 13, wherein the selected operating mode of the internal combustion engine is determined by polling an engine controller.

15. A control device (28) for monitoring the function of the particulate filter in the exhaust gas duct of the internal combustion engine, which is organized to carry out the method according to claim 1.

16. A non-transitory data storage medium having a computer program stored on it which makes a control device (28) carry out the method according to claim 1 when it is executed on the control device (28).

* * * * *